(12) United States Patent
Kondo

(10) Patent No.: US 8,057,960 B2
(45) Date of Patent: Nov. 15, 2011

(54) ELECTRODE FOR FUEL CELLS AND METHOD FOR MANUFACTURING THE SAME, AND FUEL CELL USING THE SAME

(75) Inventor: Junichi Kondo, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/771,468

(22) Filed: Apr. 30, 2010

(65) Prior Publication Data

US 2010/0279199 A1   Nov. 4, 2010

Related U.S. Application Data

(63) Continuation of application No. PCT/JP2009/005026, filed on Sep. 30, 2009.

(30) Foreign Application Priority Data

Apr. 28, 2009   (JP) ................................ 2009-109181

(51) Int. Cl.
*H01M 8/10* (2006.01)
*H01M 8/00* (2006.01)
*H01M 4/88* (2006.01)

(52) U.S. Cl. ........ 429/524; 429/484; 429/535; 429/491; 429/492; 502/101

(58) Field of Classification Search .................. None
See application file for complete search history.

(56) References Cited

U.S. PATENT DOCUMENTS

| | | | |
|---|---|---|---|
| 6,660,424 B1 * | 12/2003 | Gyoten et al. ................. | 429/457 |
| 7,662,505 B2 | 2/2010 | Suzuki | |
| 2004/0053113 A1 | 3/2004 | Nishikawa et al. | |
| 2007/0202373 A1 | 8/2007 | Hojo et al. | |
| 2008/0026276 A1 | 1/2008 | Hase | |
| 2008/0152978 A1 | 6/2008 | Hamaguchi et al. | |
| 2009/0023033 A1 | 1/2009 | Tsujiko et al. | |
| 2009/0197133 A1 | 8/2009 | Hamaguchi | |

FOREIGN PATENT DOCUMENTS

| | | | |
|---|---|---|---|
| JP | 07-105991 | | 4/1995 |
| JP | 08-255619 | | 10/1996 |
| JP | 2003-109608 | | 4/2003 |
| JP | 2003-142121 | * | 5/2003 |
| JP | 2005-026005 | | 1/2005 |
| JP | 2005-293867 | * | 10/2005 |
| JP | 2006-054176 | * | 2/2006 |
| JP | 2006-075709 | | 3/2006 |
| JP | 2006-114277 | | 4/2006 |
| JP | 2006-179412 | | 7/2006 |
| JP | 3889436 | | 12/2006 |
| JP | 2007-123259 | | 5/2007 |
| JP | 2007-165005 | | 6/2007 |
| JP | 2007-203216 | | 8/2007 |
| JP | 2007-213988 | | 8/2007 |
| JP | 2007-250210 | | 9/2007 |
| JP | 2008-501211 | | 1/2008 |
| WO | WO 03/026051 A1 | | 3/2003 |
| WO | WO 2004/040679 A1 | | 5/2004 |
| WO | WO 2005/101428 A1 | | 10/2005 |
| WO | WO 2007/004716 A1 | | 1/2007 |

* cited by examiner

*Primary Examiner* — Barbara Gilliam
*Assistant Examiner* — Angela Martin
(74) *Attorney, Agent, or Firm* — McDermott Will & Emery LLP

(57) ABSTRACT

Provided is a method for manufacturing an electrode for fuel cells which can manufacture an electrode having superior electric power generation characteristics by enlarging the contact area of a polymer electrolyte with catalyst particles to increase the area of the three-phase interface, resulting in improvement of availability of the catalyst particle surface. According to the method for manufacturing an electrode for fuel cells of the present invention, an electrode for fuel cells is obtained by: binding catalyst particles and porous carbon particles to a base material to form a catalyst porous structure; preparing an electrolyte precursor mixture containing a polymerizable electrolyte precursor represented by $(R^1O)_3Si-R^2-SO_3H$ (wherein, $R^1$ represents a hydrogen atom or an alkyl group having 1 to 4 carbon atoms; and $R^2$ represents an alkylene group having 1 to 15 carbon atoms), a polymerizable spacer precursor represented by $(R^3O)_m SiR^4_n$ (wherein, $R^3$ represents a hydrogen atom or an alkyl group having 1 to 4 carbon atoms; and $R^4$ represents $-(CH_2)_x-(CF_2)_y-CF_3$), and a solvent; impregnating the catalyst porous structure with the electrolyte precursor mixture to form a catalyst-electrolyte precursor complex; and performing a copolymerization reaction of the aforementioned compounds in the complex to form a water-insoluble polymer electrolyte layer containing a copolymer.

2 Claims, 2 Drawing Sheets

ELECTRODE FOR FUEL CELLS AND METHOD FOR MANUFACTURING THE SAME, AND FUEL CELL USING THE SAME

This is a continuation application under U.S.C 111(a) of pending prior International application No. PCT/JP2009/005026, filed on Sep. 30, 2009, which in turn claims the benefit of Japanese Application No. 2009-109181 filed on Apr. 28, 2009, the disclosures of which Application are incorporated by reference herein.

TECHNICAL FIELD

The present invention relates to an electrode for fuel cells and a method for manufacturing the same and a fuel cell using the same, and more specifically relates to an electrode for use in polymer electrolyte fuel cells and a method for manufacturing the same, and a polymer electrolyte fuel cell using the same.

BACKGROUND ART

Fuel cells allow a fuel capable of producing a proton (for example, hydrogen) to be electrochemically reacted with an oxidizing agent containing oxygen (for example, air), to generate electric power.

Cathode electrodes of fuel cells are configured by supporting precious metal catalyst particles having a small particle size on electrically conductive porous fine powders such as carbon fine powders. Upon operation of fuel cells, concomitantly with electron transfer from the electrically conductive fine powders to the catalyst particles, protons move from the electrolyte membrane to the catalyst particles, and thus a catalytic reaction of the electrons, gaseous oxygen and the protons proceed on the catalyst particle surfaces to produce water.

The reaction center where the catalytic reaction occurs is generally referred to as three-phase interface. The area of this three-phase interface is an effective area of the catalyst particles with which the protons can be efficiently in contact, and as this area becomes greater, availability of the catalyst is improved, leading to improvement of the cell performances.

For manufacturing electrode for fuel cells, a method has been proposed in which a polymer electrolyte is mixed by stirring with electrically conductive fine powders supporting catalyst particles to cover the catalyst particle surface with the polymer electrolyte (see, for example, Patent Document 1, paragraph No. 0002).

However, in such a catalyst layer formed by mixing the electrically conductive fine powders supporting the catalyst particles with the polymer electrolyte material by stirring, the catalyst surface is embedded in the polymer electrolyte material, and thus problems based on a small area of the three-phase interface do occur.

In this respect, in order to expose the catalyst particles on the uppermost surface, a method of forming an electrode has been proposed which comprises forming a porous electrode layer supporting catalyst fine particles, and thereafter applying a dispersion liquid of a polymer electrolyte on the electrode layer (see, for example, Patent Document 2, paragraph Nos. 0008-0011).

As the electrolyte membrane for fuel cells and the electrolyte layer in the electrode, perfluorosulfonic acid based polymer electrolyte typified by Nafion® (manufactured by Du Pont Kabushiki Kaisha, trade name) has been generally used.

Since these polymer electrolyte materials have a great particle size in the dispersion solvent, they do not fill small air spaces contained in the porous electrode layer. Thus, the electrolyte material does not reach the vicinity of the catalyst fine particles, and as a result, the problems based on a small area of the three-phase interface have not been solved yet.

As additional other polymer electrolyte materials, hydrocarbon polymer based sulfonic acid electrolytes, and polysiloxane based sulfonic acid electrolytes have been reported (see, for example, Patent Documents 3 and 4). Alternatively, electrolyte materials using inorganic oxide particles modified with an ionic functional group such as a sulfonic acid group on the surface have been also proposed (see, for example, Patent Documents 2 and 5).

Since these polymer electrolyte materials have a great particle size in a dispersion solvent, they do not fill small air spaces contained in the porous electrode layer. Thus, the electrolyte material does not reach the vicinity of the catalyst fine particles, and as a result, the problems based on a small area of the three-phase interface have still not been solved.

Accordingly, there have been problems of a small effective area of the catalyst particles as a result of the small area of the three-phase interface since the contact area of the catalyst fine particles with the electrolyte material is not sufficient.

PRIOR ART DOCUMENTS

Patent Documents

Patent Document 1: JP-A No. 2003-109608
Patent Document 2: JP-A No. 2005-026005
Patent Document 3: JP-A No. 2007-123259
Patent Document 4: JP-A No. 2006-114277
Patent Document 5: JP-B No. 3889436
Patent Document 6: International Publication No. 2003/026051
Patent Document 7: International Publication No. 2004/040679
Patent Document 8: JP-A No. 2006-179412
Patent Document 9: JP-A No. Hei 07-105991
Patent Document 10: JP-A No. Hei 08-255619

SUMMARY OF THE INVENTION

Problems to be Solved by the Invention

According to the prior arts described above, the area of the three-phase interface has been small due to an insufficient contact area of a polymer electrolyte with catalyst particles, and thus protons are not supplied sufficiently to the vicinity of the catalyst particles. For this reason, there has been a problem of inferior availability of the catalyst.

The present invention solves the problems as described in the foregoing, and an object of the invention is to provide a method for manufacturing an electrode for fuel cells which can manufacture an electrode having superior electric power generation characteristics by enlarging the contact area of a polymer electrolyte with catalyst particles to increase the area of the three-phase interface, resulting in improvement of availability of the catalyst particle surface, and to further provide an electrode for fuel cells which can be obtained by this method, and a fuel cell comprising the same.

Means for Solving the Problems

In order to solve the conventional problems described above, the method for manufacturing an electrode for fuel cells according to the present invention comprises the steps of:

binding catalyst particles and porous carbon particles to a base material to form a catalyst porous structure;

preparing an electrolyte precursor mixture containing a polymerizable electrolyte precursor represented by $(R^1O)_3Si$—$R^2$—$SO_3H$ (wherein, $R^1$ represents a hydrogen atom or an alkyl group having 1 to 4 carbon atoms; and $R^2$ represents an alkylene group having 1 to 15 carbon atoms), a polymerizable spacer precursor represented by $(R^3O)_m SiR^4_n$ (wherein, $R^3$ represents a hydrogen atom or an alkyl group having 1 to 4 carbon atoms; $R^4$ represents —$(CH_2)_x$—$(CF_2)_y$—$CF_3$ (wherein, x represents 0, 1 or 2, and y represents an integer of 4 to 18); m represents 2 or 3; and n represents 1 or 2, and wherein the sum of m and n is 4), and a solvent;

impregnating the catalyst porous structure with the electrolyte precursor mixture to form a catalyst-electrolyte precursor complex; and performing a copolymerization reaction of the polymerizable electrolyte precursor with the polymerizable spacer precursor in the catalyst-electrolyte precursor complex to form a water-insoluble polymer electrolyte layer composed of a copolymer of the polymerizable electrolyte precursor and the polymerizable spacer precursor, to obtain an electrode for fuel cells comprising the base material, the catalyst particles, the porous carbon particles and the polymer electrolyte layer.

According to this configuration, the electrolyte layer can be satisfactorily arranged even in the vicinity of the catalyst particles located inside the fine structure in the porous carbon particles, and thus the electrolyte layer that serves as a proton transfer path can be formed on the catalyst porous structure surface, with high density and high dispersion.

The electrode for fuel cells of the present invention can be obtained by the aforementioned manufacturing method, which is an electrode for fuel cells comprising a catalyst porous structure comprising a base material, catalyst particles and porous carbon particles, and a water-insoluble electrolyte layer provided on the surface of the catalyst porous structure, in which the electrolyte layer is composed of a copolymer of a polymerizable electrolyte precursor represented by $(R^1O)_3Si$—$R^2$—$SO_3H$ (wherein, $R^1$ represents a hydrogen atom or an alkyl group having 1 to 4 carbon atoms; and $R^2$ represents an alkylene group having 1 to 15 carbon atoms), and a polymerizable spacer precursor represented by $(R^3O)_m SiR^4_n$ (wherein, $R^3$ represents a hydrogen atom or an alkyl group having 1 to 4 carbon atoms; $R^4$ represents —$(CH_2)_x$—$(CF_2)_y$—$CF_3$ (wherein, x represents 0, 1 or 2, and y represents an integer of 4 to 18); m represents 2 or 3; and n represents 1 or 2, and wherein the sum of m and n is 4).

The fuel cell of the present invention comprises a cathode electrode formed of the aforementioned electrode for fuel cells, an anode electrode, and an electrolyte layer provided between the cathode electrode and the anode electrode.

Effects of the Invention

According to the method for manufacturing an electrode for fuel cells of the present invention, an electrode having superior electric power generation characteristics can be manufactured by increasing the area of the three-phase interface to improve the availability of the catalyst particle surface.

MODE FOR CARRYING OUT THE INVENTION

Figure 1:
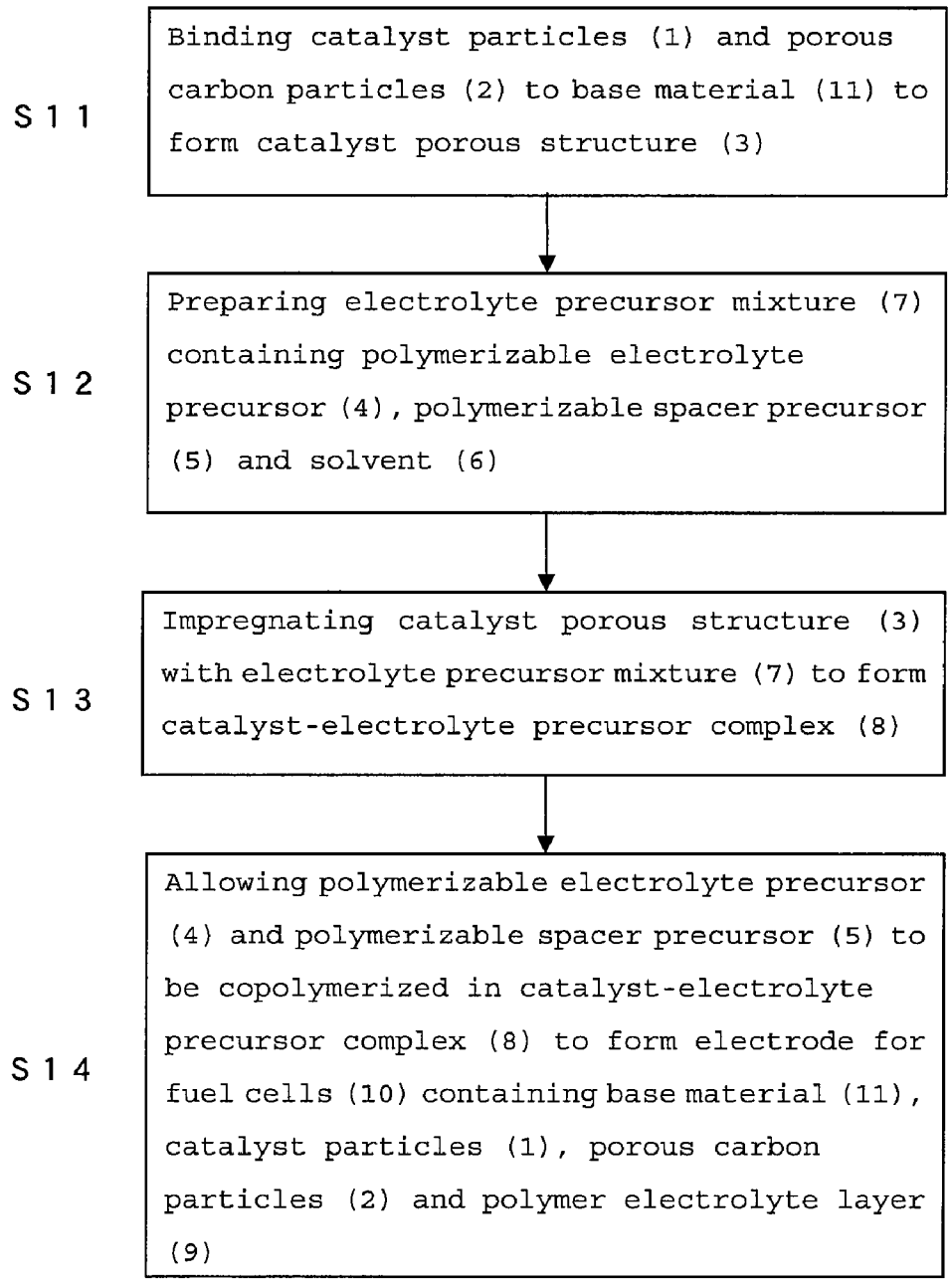
FIG. 1 shows a process flow chart illustrating the method for manufacturing an electrode for fuel cells according to an embodiment of the present invention.

Hereinafter, embodiments of the present invention will be described with reference to Figures.

In the present embodiment, an electrode for fuel cells is manufactured by carrying out steps S11 to S14.

First, in the step S11, a catalyst porous structure (3) is formed by binding catalyst particles (1) and porous carbon particles (2) to a base material (11).

The catalyst particles (1) herein refer to metal catalyst particles which have been used for electrodes in fuel cells, particularly in polymer electrolyte fuel cells. In particular, the catalyst particles (1) refer to particles that catalyze the reaction of proton, oxygen and an electron to generate water on a cathode electrode. Specifically, platinum nanoparticles may be used. The platinum nanoparticle has a mean particle diameter of generally 1 to 5 nm, and has a specific surface area of approximately 50 to 200 $m^2/g$.

The porous carbon particles (2) are an electrically conductive porous material which not only functions as a carrier for supporting the catalyst particles (1) in the electrode for fuel cells but plays a role in transferring electrons to catalyst particles. There exist fine pores at a minimum size of several nm in the porous carbon particles, and the catalyst particles (1) can be supported inside the fine pores. The mean particle diameter of the porous carbon particles is greater than the mean particle diameter of the catalyst particles, and is usually approximately 20 to 100 nm. The porous carbon particles have a specific surface area of approximately 100 to 800 $m^2/g$.

The porous carbon particles are used by binding to the surface of the base material (11). As the base material (11), a base material having gas diffusivity such as a carbon paper or carbon cloth can be used so that the fuel and oxidizing agent gases can be diffused over the catalyst particles, and the water thereby generated can be discharged. In order to bind the porous carbon particles to the surface of the base material, a carbon thin film formed by baking an organic polymer may be employed.

In the catalyst porous structure (3), the porous carbon particles (2) are bound to the surface of the base material (11), and the catalyst particles (1) are supported on the surface of the porous carbon particles (2), including the surfaces of fine micropores. Although the method for forming this structure is not particularly limited, the structure (3) can be formed by, for example, binding the porous carbon particles to the surface of the base material, and separately, preparing a solution that contains a platinum-containing compound, impregnating the porous carbon particles bound to the base material surface with the solution, and thereafter allowing platinum to be deposited on the surface of the porous carbon particles by means of heat, for example.

In the step S12, an electrolyte precursor mixture (7) containing a polymerizable electrolyte precursor (4), a polymerizable spacer precursor (5) and a solvent (6) is prepared.

The polymerizable electrolyte precursor (4) is a precursor of the polymer electrolyte that constitutes the polymer electrolyte fuel cell, and is a monomer having polymerizability. Polymerization of the polymerizable electrolyte precursor (4) enables the polymer electrolyte to be formed. Specifically, the polymerizable electrolyte precursor (4) is a compound having a proton conductive functional group and a condensing polymerizable functional group, and is represented by the formula of: $(R^1O)_3Si-R^2-SO_3H$. In the formula, $R^1$ represents a hydrogen atom or an alkyl group having 1 to 4 carbon atoms; $R^2$ represents an alkylene group having 1 to 15 carbon atoms; and $R^1$ that is present in the number of three per molecule may be the same or different.

The sulfonic acid group $-SO_3H$ in the above formula is a proton conductive functional group, and sandwiched between the anode electrode and the cathode electrode in the polymer electrolyte fuel cell to serve in transferring protons from the anode electrode to the cathode electrode.

The condensing polymerizable functional group represented by $(R^1O)_3Si-$ in the above formula is a functional group that readily reacts with one another under conditions of heating and/or a reduced pressure to allow a condensation polymerization reaction to proceed. Since the polymerizable electrolyte precursor (4) has this condensing polymerizable functional group, a polymer can be formed by polymerization in the step S14 explained later. Upon polymerization, silicon atoms are bound with one another via an oxygen atom to form a siloxane bond, and release water or $R^1OH$.

Examples of the alkyl group having 1 to 4 carbon atoms in the above formula include e.g., methyl group, ethyl group, n-propyl group, isopropyl group, n-butyl group, and t-butyl group. Of these, methyl group is preferred in light of high reactivity and ease in elimination after the polymerization.

The alkylene group represented by $R^2$ may be selected ad libitum from among alkylene groups having 1 to 15 carbon atoms. The alkylene group may be either linear or branched. The alkylene group is preferably an alkylene group having 2 to 10 carbon atoms. The number of carbon atoms falling within this range enables the water insolubility of the resulting polymer electrolyte to be controlled.

The polymerizable electrolyte precursor (4) may be used alone, or two or more thereof may be used in combination.

The compound represented by the above formula: $(R^1O)_3Si-R^2-SO_3H$ can be manufactured by, for example, providing a compound $(R^1O)_3Si-R^2-SH$ having a thiol group in place of the sulfonic acid group, diluting the thiol group-containing compound in an organic solvent, and thereafter oxidizing it with an oxidizing agent. The organic solvent for use in diluting the thiol group-containing compound is preferably a polar solvent as described later.

In order to control the insolubility of the resulting polymer electrolyte in water, the polymerizable spacer precursor (5) is used in combination with the polymerizable electrolyte precursor (4). Since the polymerizable spacer precursor (5) shows copolymerizability with the polymerizable electrolyte precursor (4), it is incorporated in the resulting polymer electrolyte by copolymerization, but is a compound not having a proton conductive functional group and represented by the formula of: $(R^3O)_mSiR^4_n$. In the formula, $R^3$ represents a hydrogen atom or an alkyl group having 1 to 4 carbon atoms; $R^4$ represents $-(CH_2)_x-(CF_2)_y-CF_3$; m represents 2 or 3; n represents 1 or 2; and wherein the sum of m and n is 4. In other words, the polymerizable spacer precursor (5) is a compound not having a proton conductive functional group but having a condensing polymerizable functional group, and this condensing polymerizable functional group enables it to be copolymerized with the polymerizable electrolyte precursor (4). $R^3$ that is present in the number of two or three per molecule may be the same or different. In addition, when $R^4$ is present in the number of two per molecule, the $R^4$ may be the same or different.

Examples of the alkyl group having 1 to 4 carbon atoms represented by $R^3$ include, similarly to $R^1$, methyl group, ethyl group, n-propyl group, isopropyl group, n-butyl group, and t-butyl group. Of these, methyl group is preferred in light of high reactivity and ease in elimination after the polymerization.

$R^4$ is represented by $-(CH_2)_x-(CF_2)_y-CF_3$, wherein x represents 0, 1 or 2; and y represents an integer of 4 to 18. $R^4$ is selected such that more favorable affinity of the electrolyte precursor mixture (7) with the surface of the catalyst porous structure (3) surface can be achieved.

The ratio of the polymerizable electrolyte precursor (4) and the polymerizable spacer precursor (5) used may be determined ad libitum taking into account the water insolubility and the EW value of the polymer electrolyte to be manufactured, and the molar ratio generally falls within the range of preferably 0.5 to 15:1, and more preferably 1 to 10:1, in particular.

The aforementioned EW is an abbreviation of Equivalent Weight, which represents a dry electrolyte membrane weight per mole of the sulfonic acid group. The smaller EW value indicates a greater proportion of the sulfonic acid group contained in the electrolyte. In order to achieve high proton conductivity, the electrolyte layer in the present invention has preferably the EW value almost the same as or less than that of Nafion® which has been often used as an electrolyte for fuel cells. Specifically, the electrolyte layer in the present invention preferably has the EW value of 1,100 or less; and therefore, it is preferred to adjust the ratio of the polymerizable electrolyte precursor (4) and the polymerizable spacer precursor (5) such that the EW value falls within this range.

The polymerizable spacer precursor (5) may be used alone, or two or more thereof may be used in combination.

In order to supply the protons uniformly and efficiently on the surface of the entire catalyst particles (1) contained in the catalyst porous structure (3), it is preferred that the polymerizable electrolyte precursor (4) and the polymerizable spacer precursor (5) be randomly copolymerized. It is preferred to select the combination of each material such that the random copolymerization reaction is ensured.

The solvent (6) is used in order to dissolve the polymerizable electrolyte precursor (4) and the polymerizable spacer precursor (5). Such a solvent is preferably a polar solvent so that each compound can be dissolved, and specific examples include acetone, alcohols having 1 to 4 carbon atoms (methanol, ethanol, propanol and butanol), dimethylacetamide, ethyl acetate, butyl acetate, and tetrahydrofuran. The solvent (6) may be used alone, or two or more thereof may be used in combination.

The amount of the solvent (6) used is not particularly limited as long as it can dissolve the polymerizable electrolyte precursor (4) and the polymerizable spacer precursor (5).

For preparing the electrolyte precursor mixture (7), each of the foregoing components may be mixed while stirring.

In the step S13, the catalyst porous structure (3) formed in the step S11 is impregnated with the electrolyte precursor mixture (7) prepared in the step S12 to form a catalyst-electrolyte precursor complex (8). Accordingly, penetration of the electrolyte precursor is permitted inside the fine structure in the catalyst porous structure (3).

The procedure for the impregnation is not particularly limited, and the mixture (7) may be sprayed or applied on the surface of the catalyst porous structure (3), followed by leaving it to stand still as needed.

Since a polymer electrolyte is not applied on the surface of the catalyst porous structure (3) but an electrolyte precursor in a low molecular state prior to polymerization is applied thereon in this step, penetration of the precursor can be efficiently effected even inside the fine pores and fine irregularity of the surface of the catalyst porous structure (3).

In the step S14, the polymerizable electrolyte precursor (4) and the polymerizable spacer precursor (5) are copolymerized in the catalyst-electrolyte precursor complex (8) formed in the step S13, to form a water-insoluble polymer electrolyte layer (9). Thus, an electrode for fuel cells (10) is formed which contains the base material (11), the catalyst particles (1), the porous carbon particles (2) and the polymer electrolyte layer (9).

For the copolymerization, conditions such as heat and/or reduced pressure may be selected ad libitum such that the condensation polymerization reaction proceeds between the condensing polymerizable functional groups carried by the polymerizable electrolyte precursor (4) and the polymerizable spacer precursor (5). Accordingly, the solvent (6), and the volatile by-product generated during proceeding of the polymerization reaction are eliminated, and a water-insoluble polymer electrolyte layer is formed which is composed of a copolymer of the polymerizable electrolyte precursor and the polymerizable spacer precursor.

The electrode for fuel cells (10) manufactured as in the foregoing has a structure in which fine catalyst particles are supported on the surface of the porous carbon particles bound to the base material surface, and the electrolyte layer is uniformly formed thereon by a polymerization reaction. In this electrode, unlike those manufactured by applying a polymer electrolyte on the surface of a catalyst porous structure (3), the electrolyte precursor in a low molecular state prior to polymerization is applied on the surface of the catalyst porous structure (3), and thereafter the polymerization reaction is performed to form an electrolyte layer. Therefore, the electrolyte layer is formed uniformly and with high dispersion, even inside the fine pores and fine irregularity of the surface of the catalyst porous structure (3). Consequently, the electrolyte layer can be satisfactorily arranged even in the vicinity of the catalyst particles located inside the fine structure in the porous carbon particles, and thus the electrolyte layer that serves as a proton transfer path can be formed on the catalyst porous structure surface, with high density and high dispersion.

There also exist fine pores at a minimum size of several nm in porous carbon particles (2) on the surface of the catalyst porous structure (3); however, according to the manufacturing method of the present invention, the electrolyte layer can be formed even inside of the fine pores. To the contrary, when a dispersion solution of the polymer electrolyte is applied on the surface of the catalyst porous structure (3) according to a conventional method, it is extremely difficult to form an electrolyte layer inside fine micropores since the particle size of the polymer electrolyte in the solvent is greater than the pore size of the fine micropores.

In addition, since water is continuously generated during operation in the cathode electrode of a fuel cell, the electrolyte layer in the present invention is required to be insoluble in water. This water insolubility may be regulated by the structure of the polymerizable electrolyte precursor (4) used and the structure of the polymerizable spacer precursor (5), as well as the ratio employed.

The electrode manufactured according to the present invention may be used as a cathode electrode of a fuel cell. This cathode electrode can be configured to provide a fuel cell by disposing so as to be opposite to an anode electrode via an electrolyte membrane provided therebetween and formed from a perfluorosulfonic acid based polymer such as Nafion® (manufactured by Du Pont Kabushiki Kaisha, trade name), and further sandwiching these with separators.

EXAMPLES

Hereinafter, the present invention will be explained in more detail by way of Examples, and the present invention is not limited to these Example.

Reference Example

Manufacturing and Evaluation of the Polymer Electrolyte Layer in the Present Invention In accordance with the method described above, a diluted solution of a compound having a thiol group and a condensing polymerizable silicon group is first treated with an oxidizing agent to be converted into a polymerizable electrolyte precursor (4) having a sulfonic acid group and a condensing polymerizable silicon group. Thereafter, a polymerizable spacer precursor (5) not having a sulfonic acid group but having a condensing polymerizable silicon group is added thereto followed by mixing to prepare an electrolyte precursor mixture (7). Finally, an electrolyte layer insoluble in water is obtained by eliminating volatile components such as a solvent by drying under a reduced pressure and/or heat to allow a copolymerization reaction to proceed.

Specifically, the following process was carried out. A trialkoxysilane compound having a thiol group ($(MeO)_3Si-(CH_2)_3-SH$, manufactured by Tokyo Chemical Industry Co., Ltd.) in an amount of 30 mmol was diluted in t-butanol (manufactured by Wako Pure Chemical Industries, Ltd.) to prepare a 10% by weight solution. To this thiol compound solution was added a aqueous 30% hydrogen peroxide, and was mixed by stirring under a nitrogen atmosphere at a room temperature for 15 hours to carry out an oxidation reaction. Then, 15 mmol of $(EtO)_3Si-(CH_2)_2-(CF_2)_5CF_3$ (manufactured by Sigma-Aldrich Corporation) was added thereto, and stirred for 15 min. Furthermore, ultrapure water was added thereto followed by mixing to obtain an electrolyte precursor mixture (7) in the state of a colorless, transparent and homogenous solution. This step enabled the thiol group in the thiol compound to be oxidized to give a solution of a silane compound having a converted sulfonic acid group ($(RO)_3Si-(CH_2)_3-SO_3H(RO=HO$ or $MeO)$) and $(EtO)_3Si-(CH_2)_2-(CF_2)_5CF_3$ homogenously mixed with a molar ratio of 2:1.

As a process for preparation of the aforementioned electrolyte precursor mixture (7), the following process may be also envisaged. For example, to a solution prepared by mixing a trialkoxysilane compound having a thiol group ($(MeO)_3Si-(CH_2)_3-SH$), and $(EtO)_3Si-(CH_2)_2-(CF_2)_5CF_3$ at a desired molar ratio beforehand using t-butanol as a solvent is added an aqueous 30% hydrogen peroxide. The oxidation reaction by hydrogen peroxide can convert the thiol group into a sulfonic acid group.

Next, the aforementioned solution which was the electrolyte precursor mixture (7) was developed on a Petri dish, and volatile components such as the solvent were gradually distilled away under a reduced pressure to allow the copolymerization reaction to proceed based on a condensation reaction between the silicon groups. As a result, an electrolyte layer insoluble in water was obtained in the form of a solid mass. The aforementioned substance is believed to have a siloxane ($Si-O-Si$) skeleton.

In order to ascertain the insolubility in water of the resulting electrolyte layer in the solid mass form, this solid mass was immersed in water and stirred over day and night. After the supernatant liquid was collected and water was distilled away under a reduced pressure, formation of the polysiloxane membrane was not observed, verifying the insolubility of the aforementioned electrolyte layer in water.

In addition, with respect to the synthesized substance in a solid mass form, solid NMR measurement was carried out. Accordingly, chemical shift values of signal peaks found in $^{13}$C-DDMAS-NMR (single pulse & 1H decouple) and $^{29}$Si-CPMAS-NMR (1H→13C cross polarization &1H decouple) agreed well with theoretical values expected from the intended molecular structure; therefore, it was revealed that the synthesized substance was a copolymerized product having an intended molecular structure.

According to a similar method to the foregoing, electrolyte precursor mixtures (7) of $(RO)_3Si$—$(CH_2)_3$—$SO_3H$ and $(EtO)_3Si$—$(CH_2)_2$—$(CF_2)_5CF_3$ mixed at a variety of molar ratios n:1 (n=20, 15, 10, 8, 6, 4, 2 or 1) were prepared. Each electrolyte precursor mixture was developed on a Petri dish, and thereafter a polymerization reaction was permitted by distilling away the solvent under a reduced pressure to obtain an electrolyte layer of a membranous substance.

When the insolubility in water of the electrolyte layer was ascertained similarly to the foregoing, it was revealed that the electrolyte layers of n=1 to 10 have insolubility in water. To the contrary, the electrolyte layer of n=15 or 20 was proven to be dissolved in water.

In addition, the solubility in an organic solvent of the aforementioned electrolyte layers of n=1 to 10 was ascertained. The electrolyte layer was immersed in an acetone, alcohol, or chlorine-containing solvent, and stirred over day and night. Consequently, it was revealed that the aforementioned electrolyte layer was not dissolved at all also in any of the solvents.

Examples (1) Production of Catalyst Porous Structure

Acetylene black having a particle size of about 50 nm (manufactured by Denki Kagaku Kogyo K.K.) in an amount of 4.0 g, 2.0 g of polyacrylonitrile (manufactured by Sigma-Aldrich Corporation) and dimethylacetamide (manufactured by Wako Pure Chemical Industries, Ltd.) were mixed by a ball mill. The mixed dispersion liquid in an amount of 1.69 g was dropped onto a carbon paper having an area of 19.6 cm$^2$, and the solvent was evaporated in a vacuum vessel at room temperature. Next, the carbon paper was subjected to a heat treatment at 120° C. for 2 hours using a constant-temperature vacuum dryer. Finally, this carbon paper was transferred into an infrared image furnace under an argon atmosphere, and subjected to a heat treatment by elevating the temperature at a rate of 20° C. per second from the room temperature to the end-point temperature of 800° C. for 30 min. From the foregoing, a carbon paper having on the surface thereof a layer formed by binding porous carbon fine powders thereto with a carbon thin film was obtained.

A platinum-containing polyamide acid solution in an amount of 1.26 g, which had been prepared by mixing 0.95 g of chloroplatinic acid (IV) hexahydrate (manufactured by Wako Pure Chemical Industries, Ltd.), 7.85 g of a polyamide acid solution and 17.5 g of dimethylacetamide (manufactured by Wako Pure Chemical Industries, Ltd., guaranteed) was dropped onto the carbon paper obtained as described above, and the solvent was eliminated in vacuo. Subsequently, the carbon paper was dried using a constant-temperature vacuum dryer at 200° C. for 2 hours. Finally, heating was carried out in an infrared image furnace under an argon atmosphere by elevating the temperature at a rate of 10° C. per second to the end-point temperature of 800° C. for 30 min. From the foregoing, a catalyst porous structure in which platinum nanoparticles were immobilized with high dispersion on the porous carbon fine powders bound to the carbon paper was produced.

The aforementioned polyamide acid solution was prepared by permitting a polymerization reaction of 5.00 g of 4,4'-diaminodiphenyl ether (manufactured by Tokyo Chemical Industry Co., Ltd.) and 5.45 g of pyromellitic dianhydride (manufactured by Tokyo Chemical Industry Co., Ltd.) using 120 g of a solvent dimethylacetamide.

(2) Manufacturing of Electrode A to C for Fuel Cells

First, according to the method described above, three kinds of electrolyte precursor mixtures having the composition shown in Table 1 were prepared. These three kinds of the electrolyte precursor mixtures (7) contained a polymerizable electrolyte precursor: $(RO)_3Si$—$(CH_2)_3$—$SO_3H$ and a polymerizable spacer precursor: $(EtO)_3Si$—$(CH_2)_2$—$(CF_2)_5CF_3$, at a predetermined ratio shown in Table 1. The compounds $(RO)_3Si$—$(CH_2)_3$—$SO_3H$ and $(EtO)_3Si$—$(CH_2)_2$—$(CF_2)_5CF_3$ contained in these electrolyte precursor mixtures were solvated in a low molecular state.

Next, each of the aforementioned electrolyte precursor mixture was dropped onto the catalyst porous structure obtained as described above, and was left to stand for one hour to allow for immersion. Thereafter, a polymerization reaction was permitted by elimination of the volatile components under a reduced pressure and vacuum drying while heating to produce Electrodes A to C for fuel cells containing an electrolyte layer.

It is to be noted that the electrolyte layer was formed under a vacuum drying condition at 80° C. for 2 hours in the aforementioned polymerization reaction according to conditions for a synthetic reaction of general polysiloxane.

TABLE 1

| Electrode Number | Polymerizable electrolyte precursor (4) | Polymerizable spacer precursor (5) | Mixing molar ratio (4):(5) | EW value | Catalyst reactive area (m$^2$/g · Pt) | Critical current density (mA/cm$^2$) |
|---|---|---|---|---|---|---|
| Electrode A | $(RO)_3Si(CH_2)_3SO_3H$ | $(EtO)_3Si(CH_2)_2(CF_2)_5CF_3$ | 2:1 | 400 | 29 | 800 |
| Electrode B | $(RO)_3Si(CH_2)_3SO_3H$ | $(EtO)_3Si(CH_2)_2(CF_2)_5CF_3$ | 4:1 | 290 | 50 | 650 |
| Electrode C | $(RO)_3Si(CH_2)_3SO_3H$ | $(EtO)_3Si(CH_2)_2(CF_2)_5CF_3$ | 10:1 | 240 | 44 | 600 |
| Comparative Electrode a | perfluorosulfonic acid based polymer electrolyte | | | 1100 | 23 | 300 |
| Comparative Electrode b | $(RO)_3Si(CH_2)_3SO_3H$ | $(EtO)_3Si(CH_2)_2(CF_2)_5CF_3$ | 2:1 | 400 | — | — |
| Comparative Electrode c | $(RO)_3Si(CH_2)_3SO_3H$ | — | 1:0 | 180 | — | — |

Comparative Example 1

Manufacturing of Comparative Electrode "a"

Using a dispersion liquid in ethanol of a perfluorosulfonic acid based electrolyte, Nafion®, that is a commercially available polymer electrolyte having an EW value of 1,100, Comparative Electrode "a" was produced. The production procedure was as in the following. The catalyst porous structure obtained in Example was left to stand still on a Petri dish, and to this catalyst porous structure was dropped a dispersion liquid of Nafion® in ethanol, which was left to stand for one hour to allow for immersion. Thereafter, the volatile components were eliminated under a reduced pressure, and vacuum drying was carried out while heating to produce Comparative Electrode "a" containing an electrolyte layer constituted with Nafion®.

Comparative Example 2

Manufacturing of Comparative Electrode "b"

Using an electrolyte layer obtained by polymerization from the aforementioned electrolyte precursor mixture via a drying step, production of Comparative Electrode "b" was attempted.

Specifically, an electrolyte precursor mixture (having the same composition as the electrode A) having an EW value of 380 was first prepared by mixing an electrolyte material (RO)$_3$Si—(CH$_2$)$_3$—SO$_3$H and a polymerizable spacer material (EtO)$_3$Si—(CH$_2$)$_2$—(CF$_2$)$_5$CF$_3$ at a molar ratio of 2:1. After the aforementioned electrolyte precursor mixture was developed on a Petri dish made of Teflon (registered trademark), the volatile components were eliminated under a reduced pressure, and vacuum drying was carried out while heating to synthesize an electrolyte layer in a solid powder form.

Although this solid powder form electrolyte layer was added to a variety of solvents in an attempt to prepare a dispersion solution, the electrolyte layer was insoluble in a variety of solvents, thereby leading to failure in preparing a dispersion solution. In other words, Comparative Electrode "b" failed to be produced since it was impossible to impregnate and apply an electrolyte layer in the form of a solid mass synthesized once from an electrolyte precursor mixture via a polymerization reaction after preparing the dispersion solution again, to the catalyst porous structure.

Accordingly, even though an electrolyte precursor mixture having a similar composition to that constituting the electrode A for fuel cells was used, the electrode for fuel cells failed to be manufactured after formation of the electrolyte layer once by allowing a polymerization reaction to proceed, since this electrolyte layer can be neither dissolved in a solvent nor impregnated the catalyst porous structure with.

Comparative Example 3

Manufacturing of Comparative Electrode "c"

An electrolyte precursor mixture containing a polymerizable electrolyte precursor (RO)$_3$Si—(CH$_2$)$_3$—SO$_3$H but not containing a polymerizable spacer precursor (MeO)$_3$Si—R was used in an attempt to produce Comparative Electrode "c".

Specifically, an electrolyte precursor mixture constituted only with the polymerizable electrolyte precursor (RO)$_3$Si—(CH$_2$)$_3$—SO$_3$H and a solvent was prepared to produce Comparative Electrode "c". Conditions of production other than those described above were similar to Examples.

Thus manufactured Comparative Electrode "c" was immersed in hot water of 60° C. for 2 hours, and the formed electrolyte layer was dissolved in water and was eliminated from the catalyst porous structure. Accordingly, an appropriate electric current-voltage characteristic was not exhibited, and thus utilization as an electrode for fuel cells could not be suggested.

Evaluation Method

Evaluation of Catalytically Reactive Area of Electrode for Fuel Cells

Each of the Electrodes A-G and Comparative Electrode "a" produced according to the aforementioned method was incorporated into a fuel battery cell as a cathode electrode, and the catalytically reactive area was determined according to a cyclic voltammetry. As the anode electrode, a carbon paste electrode supporting 2.0 mg/cm$^2$ of Pt was used. The cyclic voltammetry measurement was carried out while supplying a hydrogen gas (65° C., 100% RH) to the anode electrode, and a nitrogen gas (65° C., 100% RH) to the cathode electrode. This measurement was conducted with the settings of: sweeping speed of 10 mV/sec; sweeping potential width of from the lower limit being a natural potential to the upper limit being 1.0 V. The natural potential means a potential found between both electrodes in an open circuit state under the gas conditions as described above.

Figure 2:
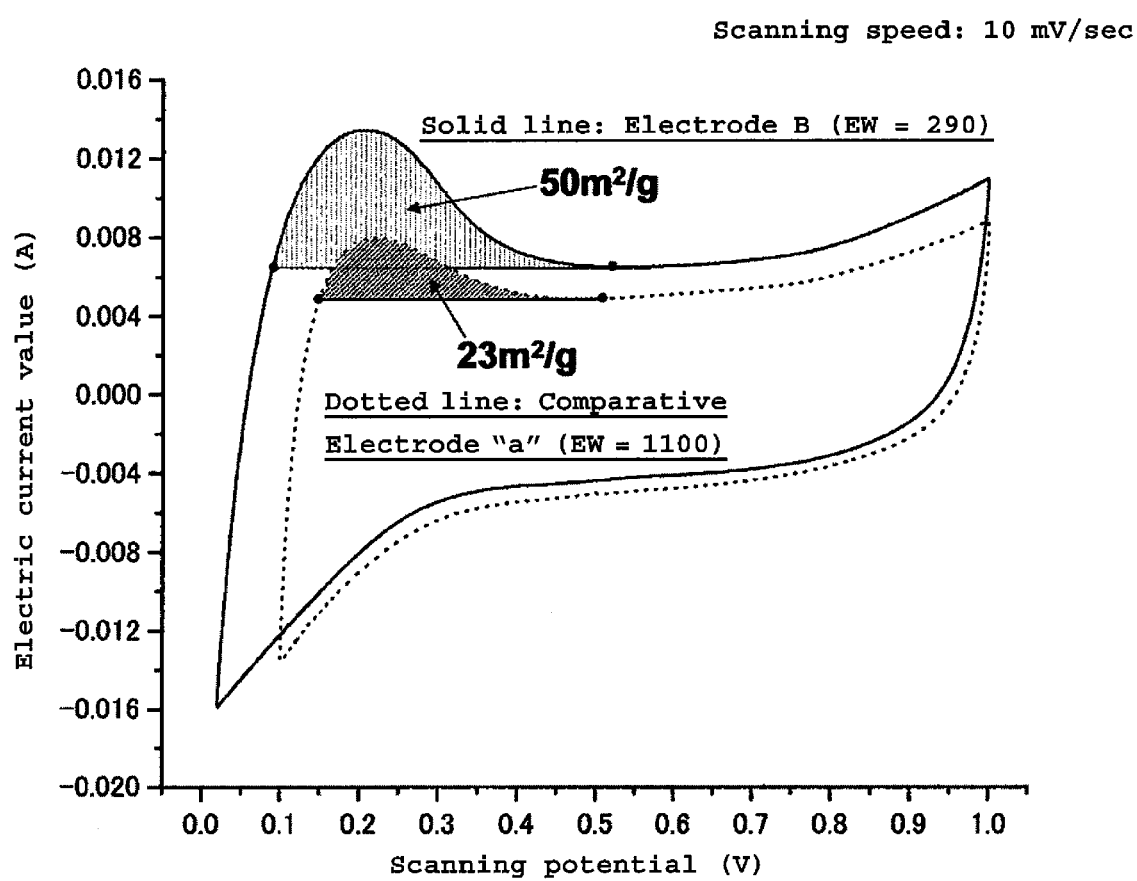
FIG. 2 shows a graph illustrating cyclic voltammograms obtained in evaluation of the catalytically reactive area of the electrode for fuel cells of Examples and Comparative Examples.

FIG. 2 shows a cyclic voltammogram obtained by the measurement on the Electrode B for fuel cells (solid line) and Comparative Electrode "a" (dotted line).

From the voltammogram obtained on each electrode, charge quantity relating to proton desorption/adsorption on platinum was calculated, and further the catalytically reactive area per unit amount of platinum was determined from the charge quantity. For example, the charge quantity in Comparative Electrode "a" was calculated from the area of a hatched region enclosed by a cycle upper curve indicated by a dotted line, and a level line indicated by a solid line.

Table 1 shows results of the catalytically reactive area and the critical current density on each electrode.

With respect to results on Comparative Electrode "a" formed by applying a dispersion liquid of a perfluorosulfonic acid based polymer electrolyte, which has been often used as an electrolyte material of conventional electrodes for fuel cells, on the catalyst porous structure, the catalytically reactive area per unit amount of platinum was 23 m$^2$/g, while the natural potential of the cathode electrode remained at a high level of approximately 100 mV (vs. SHE). Herein, the natural potential is an equilibrium potential between both electrodes in connection with the proton desorption/adsorption reaction on the platinum surface. More specifically, in this case of presenting a great positive value, it is believed that the protons failed to reach the platinum surface sufficiently on the cathode electrode.

Moreover, a test of electric power generation was performed while supplying a hydrogen gas (65° C., 100% RH) to the anode electrode and an oxygen gas (65° C., 100% RH) to the cathode electrode. Determination of the electric current-voltage characteristics revealed an electric current density at a point where the output potential became 0, i.e., critical current density generally referred to, of 300 mA/cm$^2$.

To the contrary, with regard to the results of the Electrode B in which the electrolyte layer was formed by applying on a catalyst porous structure an electrolyte precursor mixture containing a polymerizable electrolyte precursor and a polymerizable spacer precursor dispersed therein in a low molecular weight state, and thereafter allowing for polymerization, the catalytically reactive area was enormously enlarged, presenting a value of 50 m$^2$/g. In addition, the natural potential of the electrode B was significantly lower, which was approximately 25 mV (vs. SHE). The critical current density was 650 mA/cm$^2$, which was two times or more greater than that of Comparative Electrode "a" formed by applying a dispersion liquid of a polymer electrolyte.

As is shown in Table 1, it was proven with regard also to other Electrodes A and C for fuel cells that, they exhibited a greater catalytically reactive area and a greater critical current density than those of Comparative Electrode "a".

With respect to grounds for achievement of the two effects, namely enlargement of the catalytically reactive area and increase in the critical current density, the following consideration may be made.

According to conventionally employed dispersion liquids of a polymer electrolyte, it is extremely difficult to arrange the polymer electrolyte uniformly and sufficiently in a catalyst porous structure having a fine pore structure with an even smaller size (i.e., on the order of from several nm to several ten nm), due to a great size of the dispersed polymer particles. To the contrary, by using a polymerizable electrolyte precursor in a low molecular weight state, introduction of the polymerizable electrolyte precursor into fine pore structure supporting the catalyst particles readily occurs, and further, satisfactory formation of the electrolyte layer is realized in the vicinity of the catalyst particles by immobilizing via a polymerization reaction at a place as introduced. Therefore, it is considered that the proton density in the vicinity of the catalyst particles was improved, leading to improvement of the three-phase interface area and increase in the critical current density.

INDUSTRIAL APPLICABILITY

The method for manufacturing an electrode for fuel cells according to the present invention is useful for manufacturing an electrode for fuel cells having a great three-phase interface area and superior electric power generation characteristics, and fuel cell using the same. In addition, the present method is effective in immobilizing with high density an electrolyte on electrode particles and catalyst particles finely dispersed in a porous structure, and can be thus utilized in wide applications such as inexpensive electrochemical electrodes.

The invention claimed is:

1. A method for manufacturing an electrode for fuel cells comprising:
   dropping a solution that contains a platinum-containing compound onto a carbon paper or carbon cloth, and then heating the carbon paper or carbon cloth so as to obtain the carbon paper or carbon cloth where platinum particles are immobilized;
   preparing an electrolyte precursor mixture containing a polymerizable electrolyte precursor represented by $(R^1O)_3Si$—$R^2$—$SO_3H$ (wherein, $R^1$ represents a hydrogen atom or an alkyl group having 1 to 4 carbon atoms; and $R^2$ represents an alkylene group having 1 to 15 carbon atoms), a polymerizable spacer precursor represented by $(R^3O)_m SiR^4_n$ (wherein, $R^3$ represents a hydrogen atom or an alkyl group having 1 to 4 carbon atoms; $R^4$ represents —$(CH_2)_x$—$(CF_2)_y$—$CF_3$ (wherein, x represents 0, 1 or 2, and y represents an integer of 4 to 18); m represents 2 or 3; and n represents 1 or 2, and wherein the sum of m and n is 4), and a solvent;
   impregnating the carbon paper or carbon cloth where platinum particles are immobilized with the electrolyte precursor mixture to form a catalyst-electrolyte precursor complex; and
   performing a copolymerization reaction of the polymerizable electrolyte precursor with the polymerizable spacer precursor in the catalyst-electrolyte precursor complex to form a water-insoluble polymer electrolyte layer composed of a copolymer of the polymerizable electrolyte precursor and the polymerizable spacer precursor, to obtain an electrode for fuel cells comprising the base material, the catalyst particles, the porous carbon particles and the polymer electrolyte layer.

2. The method for manufacturing an electrode for fuel cells according to claim 1, wherein the solvent is at least one selected from the group consisting of acetone, an alcohol having 1 to 4 carbon atoms, dimethylacetamide, ethyl acetate, butyl acetate, and tetrahydrofuran.

* * * * *